(12) United States Patent
Buendgen et al.

(10) Patent No.: US 10,489,201 B2
(45) Date of Patent: *Nov. 26, 2019

(54) TECHNIQUES FOR MONITORING A SHARED HARDWARE RESOURCE

(71) Applicant: INTERNATIONAL BUSINESS MACHINES CORPORATION, Armonk, NY (US)

(72) Inventors: Reinhard Buendgen, Tuebingen (DE); Ulrich Mayer, Schoenbuch (DE); Klaus Werner, Moetzingen (DE); Matthias Huber, Karlsruhe (DE)

(73) Assignee: International Business Machines Corporation, Armonk, NY (US)

( * ) Notice: Subject to any disclaimer, the term of this patent is extended or adjusted under 35 U.S.C. 154(b) by 417 days.

This patent is subject to a terminal disclaimer.

(21) Appl. No.: 14/734,554

(22) Filed: Jun. 9, 2015

(65) Prior Publication Data

US 2015/0268999 A1    Sep. 24, 2015

Related U.S. Application Data

(63) Continuation of application No. 14/593,367, filed on Jan. 9, 2015.

(30) Foreign Application Priority Data

Jan. 10, 2014    (GB) .................................. 1400378.4

(51) Int. Cl.
  *G06F 9/50*    (2006.01)
  *G06F 11/30*    (2006.01)
  (Continued)

(52) U.S. Cl.
  CPC ........ *G06F 9/5011* (2013.01); *G06F 9/45558* (2013.01); *G06F 9/4881* (2013.01);
  (Continued)

(58) Field of Classification Search
  USPC ......................................................... 702/186
  See application file for complete search history.

(56) References Cited

U.S. PATENT DOCUMENTS 7,698,250 B2    4/2010    Dwork et al.
8,281,121 B2    10/2012    Nath et al.
(Continued)

FOREIGN PATENT DOCUMENTS

WO    2012158621 A1    11/2012

OTHER PUBLICATIONS

Goryczka et al. "Secure Multiparty Aggregation With Differential Privacy: A Comparative Study", 2013 URL:http://www.mathcs.emory.edu/predict/pub/secure_pais13.pdf.
Mohan et al. "GUPT: Privacy Preserving Data Analysis Made Easy", May 2012 URL:http://www.eecs.berkeley.edu/~prmohan/papers/gupt.pdf.
Bertino et al. "A Survey of QUANTIfiCATION of Privacy Preserving Data Mining Algorithms", Privacy-preserving data mining. Springer US, 2008 URL:http://web.mst.edu/~lindan/publication/privacy_metric.pdf.
(Continued)

*Primary Examiner* — Paul D Lee
(74) *Attorney, Agent, or Firm* — Michael R. Long; David Quinn

(57) ABSTRACT

A technique for monitoring a shared hardware resource in a computer system running at least two partitions includes collecting measurement data from the hardware resource. An aggregation of the measurement data over a certain time interval is computed. A noise level value adapted to a workload is calculated using a workload dependent heuristic. Noise data, based on the calculated noise level value, is generated. The computed aggregation of measurement data is mixed with the generated noise data. The mixed aggregation of measurement data is output to an external interface for monitoring.

5 Claims, 5 Drawing Sheets

(51) Int. Cl.
*G06F 9/48* (2006.01)
*G06F 21/00* (2013.01)
*G06F 9/455* (2018.01)
*G06F 21/62* (2013.01)
*G01R 29/26* (2006.01)
*G06F 11/34* (2006.01)

(52) U.S. Cl.
CPC .......... *G06F 11/3003* (2013.01); *G06F 21/00* (2013.01); *G06F 21/6245* (2013.01); *G01R 29/26* (2013.01); *G06F 11/3409* (2013.01); *G06F 2009/45591* (2013.01); *G06F 2201/815* (2013.01); *G06F 2221/2135* (2013.01)

(56) References Cited

U.S. PATENT DOCUMENTS

| | | |
|---|---|---|
| 2004/0128379 A1 | 7/2004 | Mizell et al. |
| 2005/0021488 A1 | 1/2005 | Agrawal et al. |
| 2007/0083493 A1 | 4/2007 | Dwork et al. |
| 2007/0130147 A1 | 6/2007 | Dwork et al. |
| 2009/0254971 A1 | 10/2009 | Herz et al. |
| 2010/0162402 A1 | 6/2010 | Rachlin et al. |
| 2012/0204026 A1 | 8/2012 | Shi et al. |

OTHER PUBLICATIONS

Jha, et al. "Privacy preserving clustering." . Springer Berlin Heidelberg, 2005. 397-417, Computer Security—ESORICS 2005.

TECHNIQUES FOR MONITORING A SHARED HARDWARE RESOURCE

This application is a continuation of U.S. patent application Ser. No. 14/593,367, entitled "TECHNIQUES FOR MONITORING A SHARED HARDWARE RESOURCE," filed Jan. 9, 2015, which claims priority to United Kingdom Patent Application 1400378.4, entitled "METHOD AND SYSTEM FOR MONITORING A SHARED HARDWARE RESOURCE," filed Jan. 10, 2014. The disclosure of U.S. patent application Ser. No. 14/593,367 is hereby incorporated herein by reference in its entirety for all purposes.

BACKGROUND

This application is generally directed to a shared hardware resource and, more particularly, to techniques for monitoring a shared hardware resource.

In a server with virtualization technology, like IBM System Z™ servers, several (logical) partitions share common resources, e.g., the IBM Crypto Express Adapter™ which can act as a multi domain hardware security module. The use of a shared resource by several partitions might give rise to an undesirable information flow if the resource is involved in the processing of sensitive data, as is the case for cryptographic adapters. In particular, sensitive information may leak if performance data about the common resource is measured and released for optimization and accounting purposes. For example, there is a risk that a partition can use the released global performance measurement data together with its measurements of the partition itself to determine the usage profile of another partition, thus violating the privacy of the partition. Methods from database privacy can be applied to this problem in a non-trivial way. In known solutions, data is aggregated extensively, but this offers no reliable guarantees. Strongly aggregated data, e.g., over long time intervals, have low utility for optimization purposes and offer no differential privacy.

BRIEF SUMMARY

Disclosed are a method, a data processing system, and a computer program product (embodied in a computer-readable storage device) for monitoring a shared hardware resource.

A technique for monitoring a shared hardware resource in a computer system running at least two partitions includes collecting measurement data from the hardware resource. An aggregation of the measurement data over a certain time interval is computed. A noise level value (NL) adapted to a workload is calculated using a workload dependent heuristic. Noise data, based on the calculated noise level value, is generated. The computed aggregation of measurement data is mixed with the generated noise data. The mixed aggregation of measurement data is output to an external interface for monitoring.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
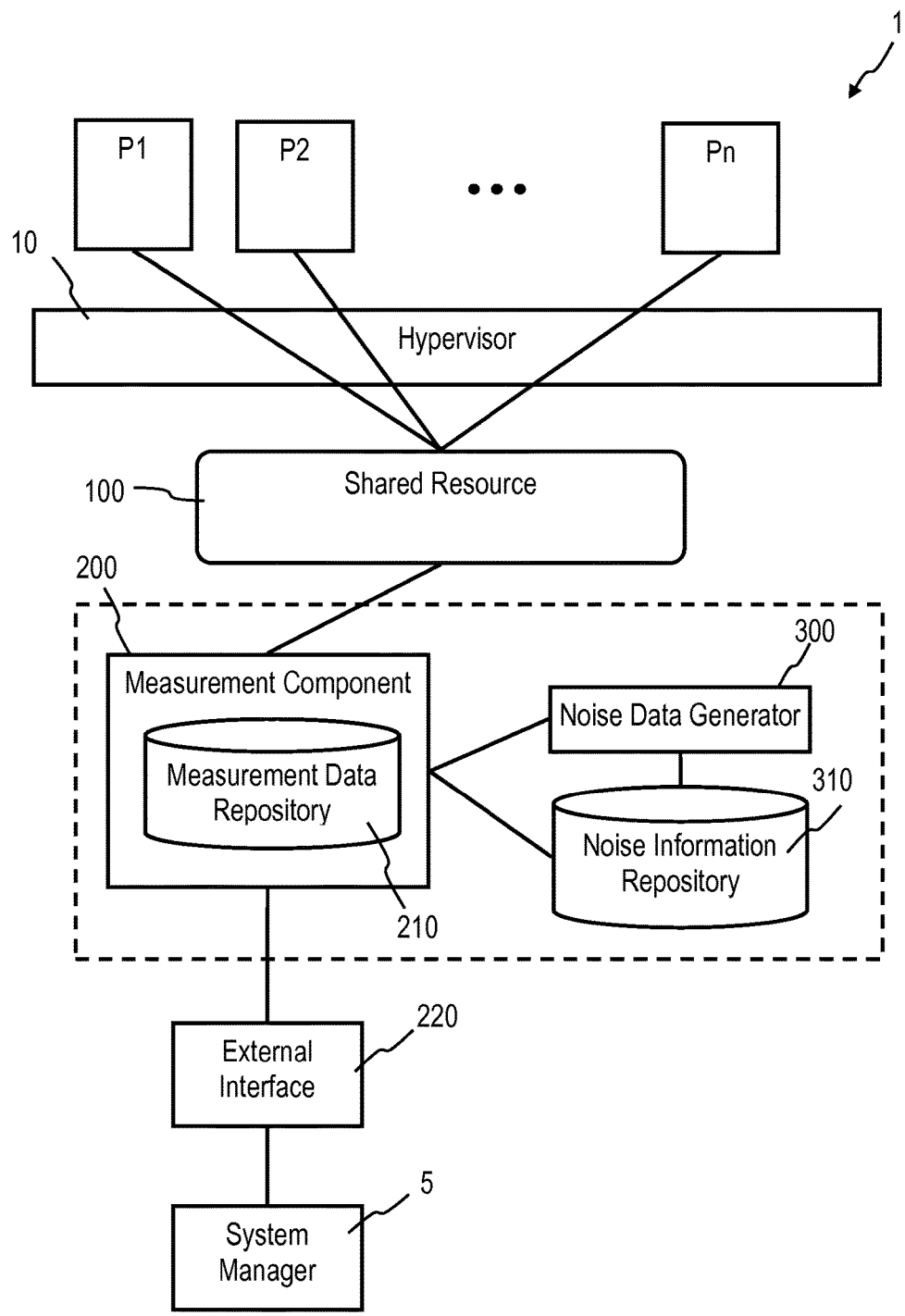
FIG. 1 is a block diagram of a virtualized computer system, in accordance with an embodiment of the present disclosure.

The illustrative embodiments provide a method, a data processing system, and a computer program product (embodied in a computer-readable storage device) for monitoring a shared hardware resource.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices.

The present disclosure relates in general to the field of virtualization technology servers with shared hardware resources and, in particular, to techniques for monitoring a shared hardware resource. Still more particularly, the present disclosure relates to a data processing system and a computer program product for monitoring a shared hardware resource in a computer system.

According to the present disclosure, techniques for monitoring a shared hardware resource are disclosed that are able to reduce a risk of violating the privacy of single partitions that share the hardware resource. The disclosed techniques address the above mentioned shortcomings of prior art monitoring of a shared hardware resource in a computer system. In one embodiment, a method for monitoring a shared hardware resource in a computer system running at least two partitions comprises: collecting measurement data from the hardware resource; computing an aggregation of the measurement data over a certain time interval; using workload dependent heuristic to adapt a noise level value to a workload; generating the noise data based on the noise level value; confounding (e.g., mixing, such as adding) the computed aggregation of measurement data with generated noise data; and outputting the confounded measurement data to an external interface for monitoring.

In at least one embodiment, the measurement data is restricted to data associated with a subset of the at least two partitions run by the computer system. In one or more embodiments, the heuristic generates at least one usage profile for the shared hardware resource comprising a list of measurements measured over a certain first time interval. Each measurement comprises a vector of values and is associated with a specific partition. The vector of values is taken from a simulation or a real computation of the workload over a period of time. In another embodiment, the heuristic computes, for each usage profile, a first sub-usage profile from the corresponding usage profile by: removing measurement data associated with a first partition from the usage profile; determining an absolute value of a difference of the aggregation of the measurements in the corresponding usage profile; determining an aggregation of measurements in the first sub-usage profile; and determining a sum of absolute values of vector components representing a difference. The heuristic repeats the procedure for other partitions to obtain, for each usage profile, sub-usage profiles and sums. The heuristic calculates for each usage profile a maximum sum of the sums and uses the maximum sum to approximate a noise level value for each usage profile used in a Laplace distribution by dividing a corresponding maximum sum by epsilon for a constant epsilon, which defines a target probability that partition specific information leaks.

In one embodiment, the heuristic calculates a maximum of approximated noise level values used as a noise level value to generate the noise data. In further embodiments, the heuristic computes a new noise level value while providing measurement data confounded with noise data generated based on an existing noise level value and then replaces the existing noise level value by the new noise level value. In one or more other embodiments, a first noise level value and a first time interval are replaced by a second noise level value and a second time interval. The first noise level value is calculated using the first time interval and the second noise level value is calculated using the second time interval (greater than the first time interval), if the first noise level value is higher than a defined value.

In another embodiment, a system for privacy preserving monitoring of a shared hardware resource in a computer system running at least two partitions comprises: a measurement component connected to the shared hardware resource that collects measurement data from the hardware resource and computes an aggregation of the measurement data over a certain time interval; a noise data generator (connected to the measurement component) that computes a noise level value based on the measurement data aggregation and generates noise data based on the noise level value; and an external interface connected to the measurement component. The measurement component confounds (e.g., mixes, such as adds) the computed aggregation of measurement data with the noise data generated by the noise data generator and outputs the confounded measurement data to the external interface for monitoring.

In at least one embodiment, the system comprises a noise information repository accessible from the measurement component and the noise data generator. The noise information repository is adapted to store noise data and/or noise level values as noise information computed by the noise data generator. In further embodiments, the measurement component samples and collects specific measurements from the shared hardware resource and provides the measurement samples to the noise data generator. In one or more other embodiments, data inside the measurement component is shielded from external access with exception of the confounded measurement data that is accessible through the external interface and measurement data that is accessible to the noise data generator. Data inside the noise data generator and data inside the noise information repository is shielded from external access. In further embodiments, the noise information repository initially does not contain noise information. The noise data generator writes noise information to the noise information repository and reads noise information from the noise information repository. The measurement component detects or reads noise information from the noise information repository.

In further embodiments, the noise data generator and/or the noise information repository are part of the measurement component. In another embodiment, a data processing program for execution in a data processing system comprises software code portions for performing a method for monitoring of a shared hardware resource when the program is run on the data processing system. In yet another embodiment, a computer program product stored on a computer-usable medium, comprises computer-readable program code for causing a computer to perform a method for monitoring of a shared hardware resource when the program is run on the computer. The basic idea of the disclosed techniques is to add noise data to measurement data. A "good" relation is kept between the amount of noise data and the allowed size of time intervals used to provide measurement samples. Rules derived from differential privacy may be used to choose noise levels and sampling intervals such that privacy is not violated and workload dependent and/or learning heuristics may be used to adapt noise levels to workload.

In general, disclosed embodiments introduce a method for monitoring a shared hardware resource that includes an aggregation step, a noise data adding step, and an initialization step to determine the noise level used to calculate the noise data. The aggregation-step computes aggregations of measurement data from the shared hardware resource over a certain time-interval. The measurement data can be restricted to data associated with only a subset of the partitions of the computer system. The time-interval cannot be chosen too small, since otherwise high-frequency changes in the usage-profile will leak information in the performance measurement data. In the second step, the aggregation computed in the first step is confounded with a bounded amount of noise data chosen from a Laplace source.

Initially, the measurement data is collected from the hardware resource but no measurement data will be available at the external interface. Instead that measurement data can be used to establish a usage profile that is used to compute the noise level value. Once a certain amount of measurement data has been collected to compute a noise level value, the noise level value is written to the noise information repository. Once a noise level value is in the noise information repository, the noise level value can be used to generate the noise data to confound the measurement data that can be read from the external interface. During subsequent operations new noise level values can be concurrently computed by using new measurement data. The new measurement data can be used for computing a new noise level value and for computing new confounded measurement data using the existing noise data calculated based on the existing noise level value. In summary, to improve the shortcomings and problems of prior art solutions outlined in the background section embodiments of the present disclosure introduce improved techniques for monitoring a shared hardware resource that reduces the amount of private information that can be learned from performance measurement data that is released.

One or more disclosed embodiments comprise a component to add noise data to aggregated data measured in short time intervals, a component that employs heuristics to determine the appropriate noise-level to compute the noise data. Various embodiments attempt to reduce the noise level value in order to increase the accuracy of the compounded measurement data available at the external interface. Advantageously, application monitoring of shared hardware resources in a hypervisor environment is possible using the disclosed techniques. For example, billing, resource planning, etc. can be implemented using the disclosed techniques while maintaining the privacy of each guest, since neither a hypervisor environment administrator nor a neighbor guest are able to learn about operations performed on a shared resource by a guest. As such, neither global monitor data nor monitor data of a neighboring guest can be used to reveal details of crypto operations of a guest, if a crypto adapter is part of the shared hardware resource.

FIG. 1 shows a virtualized computer system, in accordance with an embodiment of the present invention. Referring to FIG. 1, the illustrated embodiment employs a system for monitoring a shared hardware resource 100 in a virtualized computer system 1 running at least two partitions P1, P2, . . . , Pn. The system 1 comprises a measurement component 200 (connected to the shared hardware resource 100) that collects measurement data from the hardware resource 100 and computes an aggregation of the measurement data over a certain time interval 'T'. The system 1 also includes a noise data generator 300 (connected to the measurement component 200) that computes a noise level value 'NL' based on the measurement data aggregation and generates noise data based on the noise level value 'NL'. The system 1 further includes an external interface 220 connected to the measurement component 200, which confounds the computed aggregation of measurement data with the noise data generated by the noise data generator 300 and outputs the confounded measurement data to the external interface 220 for monitoring.

The measurement component 200 also comprises a measurement data repository 210 that collects the measurement data. The system 1 also includes a noise information repository 310 that is accessible from the measurement component 200 and the noise data generator 300. The noise information repository 310 is adapted to store noise data and/or noise level values 'NL', as noise information computed by the noise data generator 300. The virtualized computer system 1 also comprises a hypervisor 10 and host partitions P1, P2, . . . , Pn. Hypervisor 10 allocates computing resources, like the shared resource 100, to the partitions P1, P2, . . . , Pn. The external interface 220 is accessible by a system manager 5 to perform monitoring of the shared hardware resource 100.

The measurement component 200 samples and collects partition specific measurements from the shared hardware resource 100 and provides the measurement samples to the noise data generator 300. If the noise information repository 310 contains a value for the noise level 'NL', i.e., the noise level value 'NL' is initialized, the external interface 220 can output confounded measurement data that corresponds to current aggregated measurement data manipulated using the noise data from the noise data generator 300. If the noise information repository 310 contains no value for the noise level 'N'L, i.e., the noise level value 'NL' is not initialized, the external interface 220 does not output confounded measurement data. Data inside the measurement component 200 is shielded from external access with the exception of the confounded measurement data accessible through the external interface 220 and measurement data accessible to the noise data generator 300.

In the illustrated embodiment, the measurement component 200 is not a part of the hardware resource 100. In an alternative embodiment, not shown, the measurement component 200 may be part of the hardware resource 100. The noise data generator 300 accesses measurement data, computes a noise level value 'NL' (from the measurement data collected in a typical situation during a specified period of time) and stores the noise level value 'NL' into the noise information repository 310. For example, a day in early December could be a typical situation for an e-business application workload during pre-Christmas sales and the corresponding measurements may be used to calculate the corresponding noise level value 'NL'. The noise data generator 300 possibly replaces an existing noise level value 'NL' by a new noise level value 'NL' in the noise information repository 310 in order to better adapt the noise level value 'NL' to the workload.

The workload is defined as the set of different applications running on the computer system 1 determining the usage of the shared resource 100, i.e., frequency and kind of accesses to the shared resource 100 and their distribution over time. In the above example, it is assumed that the workload has a typical access pattern to the shared resource 100 for the pre-Christmas period, so the noise level value 'NL' can be used for all days in December. If a previously computed noise level value 'NL' is available in the noise information repository 310, the noise data generator 300 computes noise data according to the previous noise level value 'NL'. The data inside the noise data generator and in the noise information repository 310 is shielded from external access. In one embodiment, the noise data generator 300 and the noise information repository 310 are not part of the measurement component 200. In an alternative embodiment, the noise data generator 300 and/or noise information repository 310 may be part of the measurement component 200.

Initially, the measurement data is collected from the shared hardware resource 100 but no measurement data will be available at the external interface 220, since the noise information repository 310 initially does not contain a noise level value 'NL', i.e., the noise level value 'NL' is not initialized. Instead, that measurement data is used to establish a usage profile, which is used to compute a noise level value 'NL'. Once a certain amount of measurement data has been collected to compute the noise level value 'NL', the noise level value 'NL' is written to the noise information repository 310. Once a noise level value 'NL' is in the noise information repository 310 that noise level value 'NL' is then used to generate noise data that is used to confound the measurement data, which can be read from the external interface 220. During subsequent operation, new noise level values 'NL' can be concurrently computed by using new measurement data for both computing a new noise level and computing new confounded data, using the existing noise level.

Figure 2:
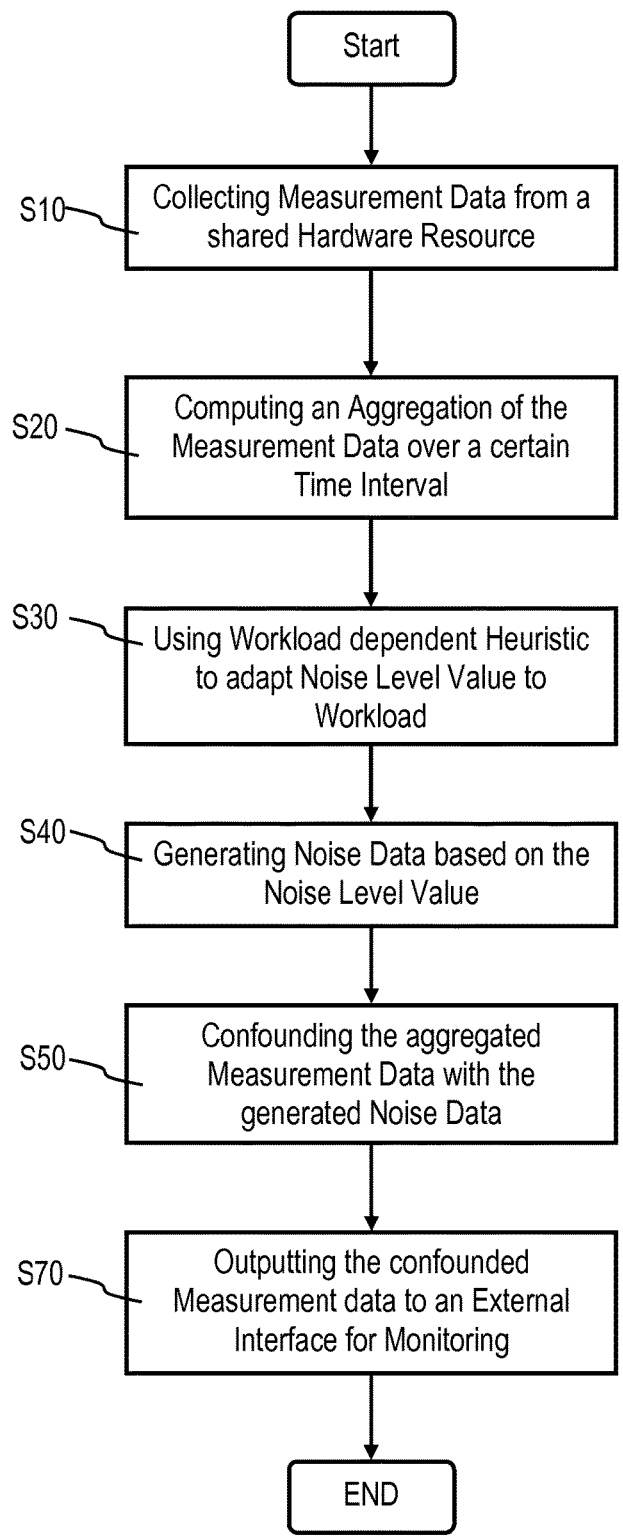
FIG. 2 is a schematic flow diagram of a method for monitoring of a shared hardware resource, in accordance with an embodiment of the present disclosure.

FIG. 2 shows a method for privacy preserving monitoring of a shared hardware resource, in accordance with an embodiment of the present disclosure. FIGS. 3-6 show a more detailed representation of the method for privacy preserving monitoring of a shared hardware resource of FIG. 2, in accordance with an embodiment.

Referring to FIG. 2, the illustrated embodiment implements a process for monitoring a shared hardware resource 100 in computer system 1 running at least two partitions P1, P2, . . . , Pn. The process includes a block S10 where measurement data is collected from the hardware resource 100. In block S20 an aggregation of the measurement data over a certain time interval 'T' is computed. In block S30 a workload dependent heuristic is used to adapt the noise level value 'NL' to the workload. The workload dependent heuristic is shown in detail in FIG. 5. In block S40 noise data is generated based on the noise level value 'NL'. In block S50 the aggregation of the measurement data is confounded (mixed) with the generated noise data. In block S70 the confounded aggregation of the measurement data is output to the external interface 220 for monitoring.

Figure 3:
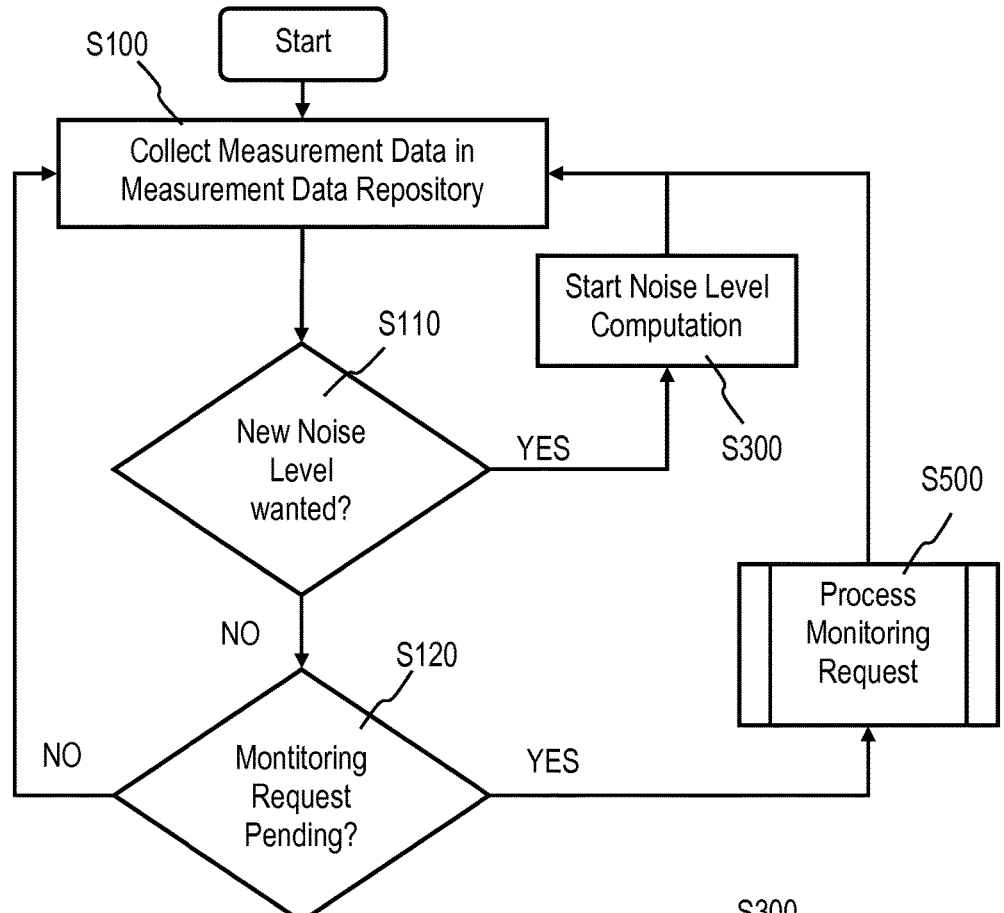
FIGS. 3-6 depict a more detailed schematic flow diagram of the method for monitoring of a shared hardware resource of FIG. 2, in accordance with an embodiment of the present disclosure.

Referring to FIG. 3, in block S100 the measurement data is collected in the measurement data repository 210. In block S110 a check is performed to determine if a new noise level value 'NL' is to be calculated. If no new noise level value 'NL' is to be calculated, block S120 checks whether a monitoring request, for example, from the system manager 5, is pending. If a new noise level value 'NL' is to be calculated, the process starts a noise level computation in block S300. If no monitoring request is pending, the process returns to block S100. If a monitoring request is pending, the process starts the processing of the monitoring request in block S500.

Figure 4:
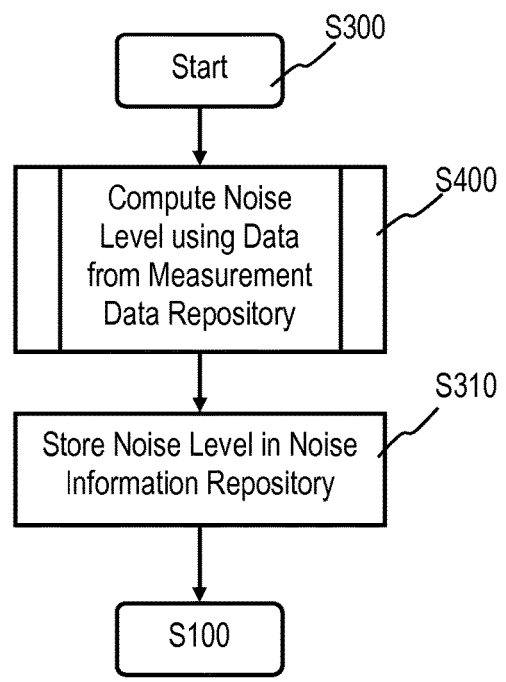

Referring to FIG. 4, after starting the noise level computation in block S300, in block S400 a noise level value 'NL' is computed using measurement data from the measurement data repository 210. In block S310 the calculated noise level value 'NL' is stored in the noise information repository 310.

Figure 5:
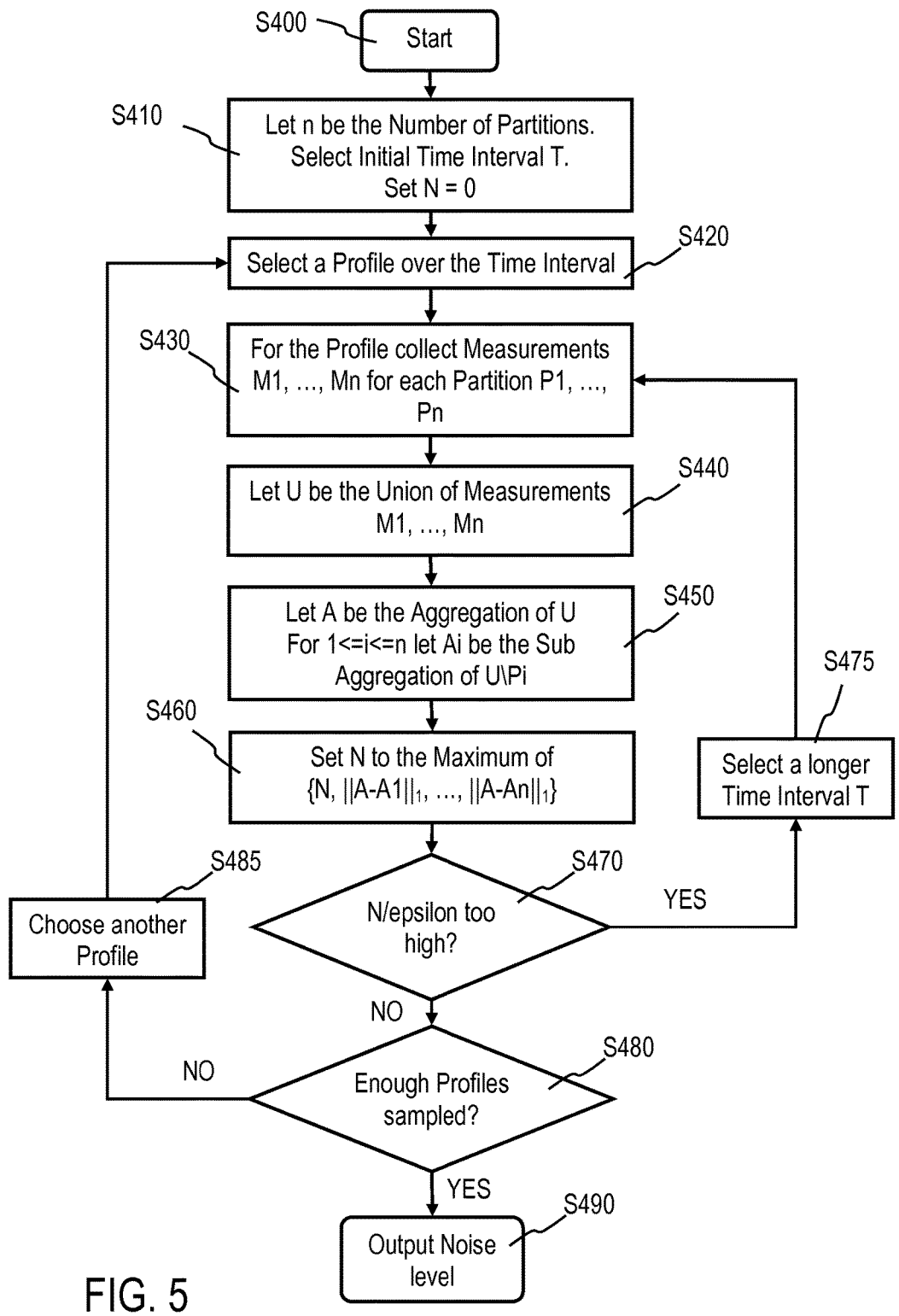

Referring to FIG. 5, showing the workload depending heuristic derived from an access pattern to the shared resource 100, in an initialization block S410 of the noise level computation process S400, variables and parameters to calculate the noise level value 'NL' are set to initial values. For example, the number of partitions P1, . . . , Pn of the virtualized computer system 1 is assigned to a first parameter 'n', and a variable 'N' is set to zero (0). Further, an initial time interval 'T' is selected. In block S420, a first usage profile 'D1' over the time interval 'T' is selected. The first usage profile 'D1' is represented by a list of measurements M1, . . . , Mn over the time-interval 'T', wherein each measurement M1, . . . , Mn is associated with a specific partition P1, . . . , Pn.

In block S430 the measurements M1, . . . , Mn for each partition P1, . . . , Pn are collected for the first profile 'D1'. Each measurement M1, . . . , Mn comprises a vector of values. In block S440 and S450, a union of measurements M1, . . . , Mn is assigned to a variable 'U', and a total aggregation 'A' is calculated for the union 'U'. For each partition P1, . . . , Pn the set of measurements U\Pi (Union U of measurements M1, . . . , Mn without measurement Mi of partition Pi) and a corresponding sub-aggregation Ai is calculated. In other words, based on the first usage profile 'D1' a first sub-usage profile 'D1_1' is calculated by removing measurement data M1 associated with the first partition P1 from the first usage profile 'D1'. Further, an absolute value of a difference of the total aggregation 'A' of the measurements M1, . . . , Mn in the corresponding usage profile 'D1' and a sub-aggregation 'A1' of the set of measurements U\M1 in the first sub-usage profile 'D1_1', and a first sum $m1\_1 = \|A-A1\|_1$ of absolute values of vector components representing this difference is calculated.

Blocks S440 and S450 are repeated for all other partitions P2, . . . , Pn thereby obtaining further sub-aggregation A2, . . . , An, sub-usage profiles D1_2, . . . , D1_$n$, and further sums m1_2, . . . m1_$n$. In block S460 for the first usage profile 'D1' a maximum sum N_1 of all sums m1_1, . . . , m1_$n$ is calculated. Further the variable 'N' used to approximate the noise level value 'NL' is set to the maximum of $\{N, \|A-A1\|_1, \ldots, \|A-An\|_1\}$ for the first usage profile 'D1'. To approximate the noise level value 'NL' used in a Laplace distribution, the variable 'N' is divided by epsilon (ε) for a constant epsilon (ε), which defines a target probability that partition-specific information leaks. Block S470 checks, if the calculated noise level value 'NL' is higher than a defined threshold value. For example, the threshold value may be defined as configurable percentage of an average value of vector components of the collected measurements M1, . . . , Mn.

If the noise level value 'NL' is higher than the defined threshold value, a longer time interval 'T' is selected in block S475, and blocks S430 to S470 are repeated for the new, longer time interval 'T'. If the noise level value 'NL' is not higher than the defined threshold value, the process continues with block S480. Block S480 checks if a certain number of usage profiles D1, . . . , Dk are sampled. If not, block S485 chooses another usage profile D2, . . . , Dk, and blocks S430 to S480 are repeated for the new usage profile D2, . . . , Dk. If the certain number of usage profiles D1, . . . , Dk are sampled, the calculated noise level value 'NL' is output to the noise information repository 310 in block S490.

Figure 6:
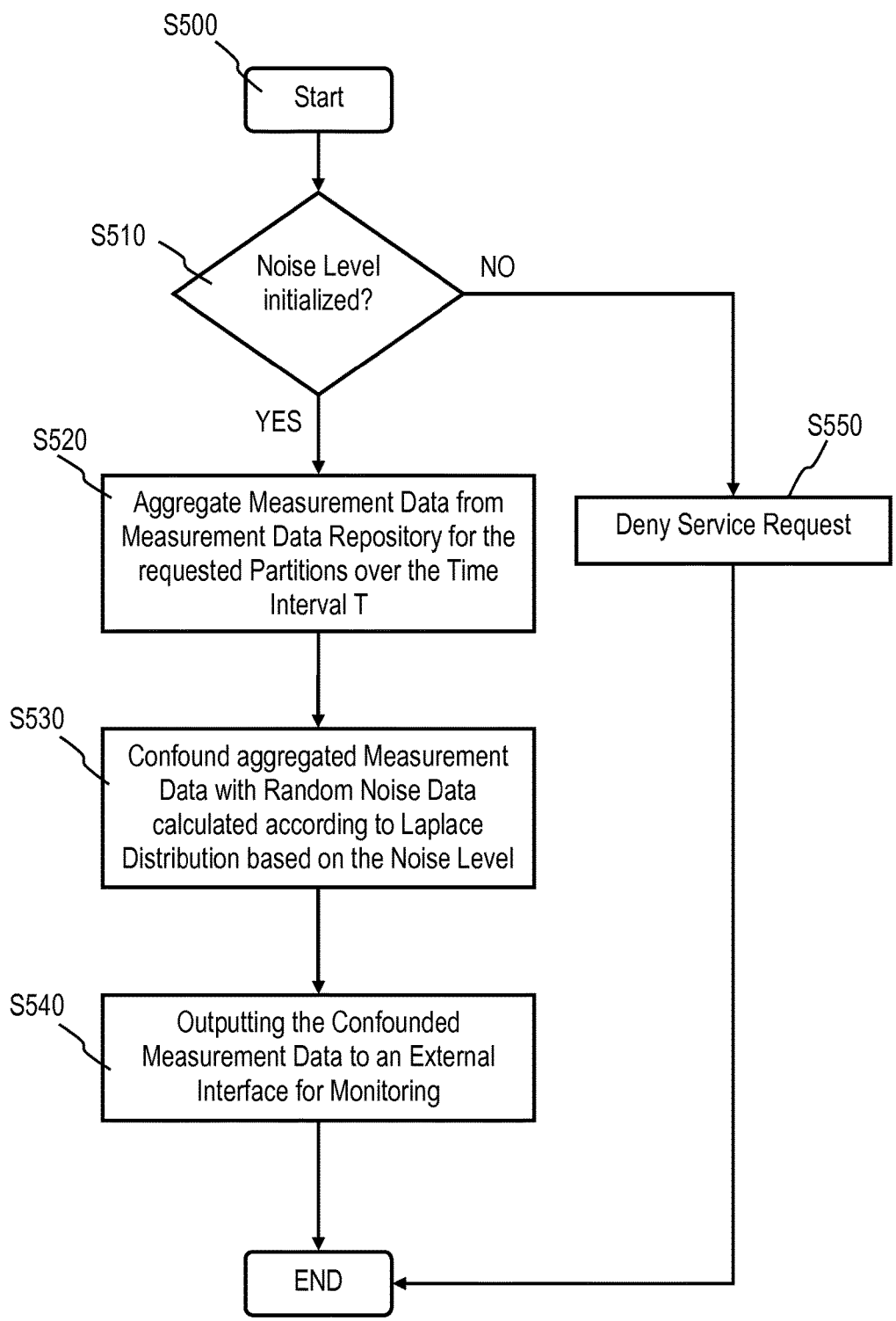

Referring to FIG. 6, after the start of processing the monitoring request in block S500, block S510 checks if the noise level value 'NL' is initialized, i.e., if a noise level value 'NL' is stored in the noise information repository 310. If not, the service request is denied in block S550 and the process ends. If a noise level value 'NL' is initialized, the process continues with block S520. In block S520 measurement data from the measurement data repository 210 for the requested partitions P1, P2, . . . , Pn is aggregated over the time interval 'T'. In block S530 the aggregation of the measurement data is confounded with random noise data calculated according to a Laplace distribution based on the noise level value 'NL' stored in the noise information repository 310. In block S540 the confounded measurement data is output to the external interface 220 for monitoring.

In summary the heuristic used by the disclosed embodiments generates at least one usage profile D1, . . . , Dk for the shared hardware resource 100 comprising a list of measurements measured over a certain first time interval 'T1'. The heuristic computes for each usage profile D1, . . . , Dk a first sub-usage profile D1_1, . . . , Dk_1 from the corresponding usage profile D1, . . . , Dk by removing measurement data associated with a first partition P1 from the usage profile D1, . . . , Dk, an absolute value of a difference of the aggregation of the measurements in the corresponding usage profile D1, . . . , Dk and an aggregation of measurements in the first sub usage profile D1_1, . . . , Dk_1, and a sum m1_1, . . . , mk_1 of absolute values of vector components representing this difference. The heuristic repeats this procedure for all other partitions P2, . . . , Pn thereby obtaining for each usage profile D1, . . . , Dk sub-usage profiles D1_2, . . . , D1_$n$, . . . , Dk_2, . . . , Dk_n and sums m1_2, . . . , m1_$n$, . . . , mk_2, . . . , mk_n. The heuristic calculates for each usage profile D1, . . . , Dk a maximum sum N_1, . . . , N_k of all sums m1_1, . . . , m1_$n$, . . . , mk_1, . . . , mk_n and uses the maximum sum N_1, . . . , N_k to approximate a noise level value NL_1, . . . , NL_k for each usage profile D1, . . . , Dk used in a Laplace distribution by dividing a corresponding maximum sum N_1, . . . , N_k by epsilon (ε) for a constant epsilon (ε), which defines a target probability that partition specific information leaks.

The heuristic calculates a maximum of all approximated noise level values NL_1, . . . , NL_k used as noise level value 'NL' to generate the noise data. Typically the usage profiles D1, . . . , Dk will be chosen as covering subsequent time intervals of equal length 'T1' which together cover a typical workload like the transactions of a typical day. The noise level 'NL' can also be improved during the operation by taking into account more recent measurement data. Alternatively, the noise level value 'NL' can be replaced by a new noise level value 'NL' based on a different set of usage profiles to account for changes in the typical usage of the resource, e.g., to reflect a workload that is typical for a specific period of time such as the end of a year. Then the heuristic computes a new noise level value 'NL2' while providing measurement data confounded with noise data generated based on an existing noise level value 'NL1'. The existing noise level value 'NL1' is then replaced by the new noise level value 'NL2'. If a noise level value 'NL' turns out to be higher than the defined threshold value, which means that measured data would be useless after being confounded with noise data, a lower noise level value NL can be computed by repeating the noise level computation on the same measurement data using a larger time interval 'T'. To do this the first noise level value 'NL1' and a first time interval 'T1' are replaced by a second noise level value 'NL2' and a second time interval 'T2'. The first noise level value 'NL1' is calculated using the first time interval 'T1' and the second noise level value 'NL2' is calculated using the second time interval 'T2' which is greater than the first time interval 'T1', if the first noise level value 'NL1' is too high.

Accordingly, techniques have been disclosed herein that advantageously monitor a shared hardware resource.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for monitoring a shared hardware resource, comprising:
    collecting, by a data processing system, measurement data from a shared hardware resource that is shared by multiple partitions, wherein the shared hardware resource includes a cryptographic adapter;
    computing, by the data processing system, an aggregation of the measurement data over a certain time interval;
    using a workload dependent heuristic to calculate, by the data processing system, a noise level value adapted to a workload;
    generating, by the data processing system, noise data based on the calculated noise level value;
    mixing, by the data processing system, the computed aggregation of the measurement data with the generated noise data to generate monitor data in which details of cryptographic operations performed by a guest using the cryptographic adapter cannot be learned by a hypervisor environment administrator or another guest from the generated monitor data thereby reducing a risk of violating privacy of the partitions that share the hardware resource; and
    outputting, by the data processing system, the generated monitor data to an external interface for monitoring, wherein the heuristic generates at least one usage profile for the shared hardware resource comprising a list of measurements measured over a first time interval, and wherein each of the measurements comprises a vector of values and is associated with a specific partition and the vector of values is taken from a simulation or a real computation of the workload over a period of time, and where the heuristic computes for each usage profile: a first sub-usage profile from the corresponding usage profile by removing measurement data associated with a first partition from the usage profile; an absolute value of a difference of the aggregation of the measurements in the corresponding usage profile and an aggregation of measurements in the first sub-usage profile; and a sum of absolute values of vector components representing the difference.

2. The method of claim 1, wherein the measurement data is restricted to data associated with a subset of at least two of the partitions run by the data processing system.

3. The method of claim 1, wherein the heuristic calculates a maximum of approximated noise level values used as noise level value to generate the noise data.

4. The method of claim 1, wherein the heuristic computes a new noise level value while providing measurement data mixed with noise data generated based on an existing noise level value and then replaces the existing noise level value by the new noise level value.

5. The method of claim 4, wherein a first noise level value and a first time interval are replaced by a second noise level value and a second time interval, and wherein the first noise level value is calculated using the first time interval and the second noise level value is calculated using the second time interval which is greater than the first time interval, if the first noise level value is higher than a defined threshold value.

* * * * *